F. A. AND J. L. CONRAD.
CAP GAUGE FOR PNEUMATIC TIRES.
APPLICATION FILED SEPT. 27, 1919.
1,422,256.
Patented July 11, 1922.
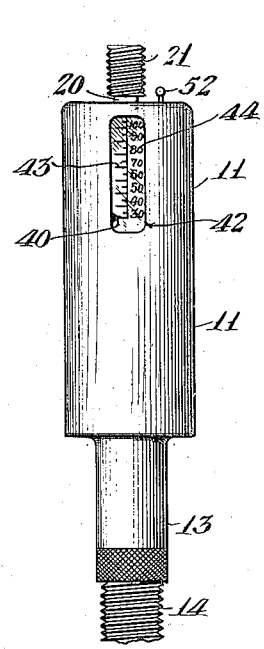
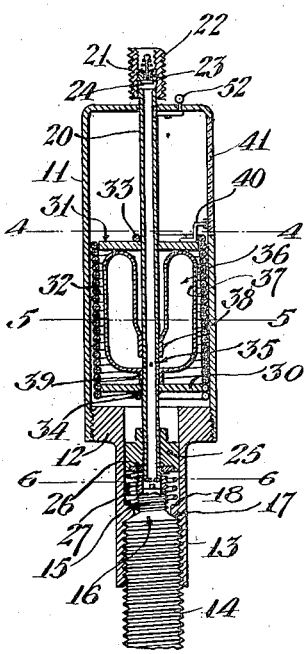

UNITED STATES PATENT OFFICE.

FREDERICK A. CONRAD AND JAMES L. CONRAD, OF LOS ANGELES, CALIFORNIA.

CAP GAUGE FOR PNEUMATIC TIRES.

1,422,256.   Specification of Letters Patent.   Patented July 11, 1922.

Application filed September 27, 1919. Serial No. 326,964.

*To all whom it may concern:*

Be it known that we, FREDERICK A. CONRAD and JAMES L. CONRAD, both citizens of the United States, residing at Los Angeles, in the county of Los Angeles and State of California, have invented a new and useful Cap Gauge for Pneumatic Tires, of which the following is a specification.

Our invention relates to a combination cap and gauge to be used upon the ordinary valve stem of pneumatic vehicle tires, being designed to be placed upon the valve stem and used in place of the ordinary cap in common use.

The principal object of this invention is to produce a cap of the class described, of simple form and construction, which is so constructed that the pressure in the tire upon which the cap is used may be readily ascertained without removing the cap from the valve stem, such cap also permitting air to be supplied to the tire without removing the cap.

For ascertaining the air pressure of pneumatic tires, ordinarily a separate instrument is used known as a tire gauge, the dust cap being removed and the tire gauge placed in contact with the end of the valve stem, such gauges being designed to open the air valve in the valve stem and the gauge operated by the air pressure within the tire, but with our invention, each valve stem is fitted with a cap which embodies a gauge and which, by simple operation, may be operated to determine the air pressure in the tire without removing the cap.

Further objects and advantages will appear hereinafter from the following description and drawings.

Referring to the drawings, which are for illustrative purposes only,

Fig. 1 is a side elevation of a device embodying a form of our invention.

Fig. 2 is a vertical sectional view of the device shown in Fig. 1, the parts being in inoperative position, Fig. 3 is a view similar to Fig. 2, showing the parts in operative position.

Fig. 4 is a sectional plan view on line 4—4, Fig. 2.

Fig. 5 is a sectional plan view on line 5—5, Fig. 2.

Fig. 6 is a sectional plan view on line 6—6, Fig. 2.

Fig. 7 is an enlarged sectional view of the coupling on the upper end of the plunger; and, Fig. 8 is an enlarged view, partly in section, of the lower end of the device.

11 designates a hollow cylindrical cap closed at its upper end and interiorly threaded at its lower end to receive the enlarged portion 12 of a hollow stem 13. The hollow stem 13 is interiorly threaded to receive the threaded portion 14 of a common valve stem, as used on pneumatic tires, such valve stem terminating in a reduced end 15. 16 indicates a beveled portion of the valve stem which engages a shoulder 17 formed on the inside of the hollow stem 13, such shoulder 17 being formed by an inwardly extending flange 18 on the stem 13.

Extending through the top of the cap 11 is a hollow plunger 20, to the upper end of which is threaded a nipple or coupling 21 exteriorly threaded as indicated at 22 to receive the common form of hose connection used in pumping pneumatic tires. The coupling 21 also forms a housing for a perforated plug 23 threaded therein which supports a valve 24 arranged to prevent the passage of air from the hollow plunger 20 to the atmosphere. The lower end of the plunger 20 is threaded and has formed thereon a head 25, the head 25 having a cushion member or gasket of leather or other suitable material, indicated at 26, arranged to engage the end of the valve stem 14 when the plunger is in operative position. A coiled spring 27 is placed between the lower face of the head 25 and the flange 18 on the stem 13 to elastically hold the plunger in upper or inoperative position.

Threaded on the plunger 20 within the cap 11 is a flat disk or collar 30. 31 designates a piston slidably mounted on the hollow plunger 20, and 32 designates a coiled spring, the upper end 33 of which engages over the piston 31 and the lower end 34 of which engages under the collar 30 thereby elastically holding the piston 31 downwardly in its inoperative position as shown in Fig. 2.

The plunger 20 is provided with a series of perforations 35 which afford communication from the interior of the plunger 20 to a pressure chamber 36 which is formed by an elastic bag 37 fitted around the plunger 20 within the spring 32, the ends 38 and 39 of the bag being secured to the hollow plunger by any suitable adhesive or cementitious material.

The piston 31 is provided with a pointer 40 mounted thereon, which travels vertically behind a window 42 formed in the side of the cap 11 by means of a glass plate 41 fastened in an opening in the side wall of the cap, such glass plate having marks indicated at 43 and figures 44 arranged to indicate the pressure within the chamber 36 according to the position of the piston 31 within the cap. The lower end of the plunger 20 is provided with two inwardly projecting toes 45 arranged to engage the upper end 46 of the valve member commonly found in the valve stem of pneumatic tires, such engagement taking place when the plunger is depressed thereby operating the valve member 46 to open the valve in the valve stem.

50 designates a latch lever pivotally mounted on a cap, arranged to engage a notch 51 in the plunger for holding the plunger in operative position in case a hand pump is used for pumping the tire. The lever 50 is provided with a knob 52 which extends through a suitable opening in the top of the cap for operation of the lever.

Our device is used by threading the hollow stem 13 upon the valve stem of the pneumatic tire as heretofore described and is operated by depressing the plunger 20. If it is desired to ascertain the air pressure in the tire, the plunger 20 is depressed by pressing downwardly on the nipple 21. The depression of the plunger opens the valve in the valve stem as heretofore described, the air from the interior of the tire passing into the hollow plunger and out of the perforations 35 into the pressure chamber 36. The walls of such chamber, that is, the bag 37, expand and exert a pressure against the piston 31, forcing the piston upwardly against the action of the spring 32 until the air pressure is equalized by the spring 32, whereupon the pressure within the tire may be read in pounds through the window of the cap, the pointer 40 indicating such pressure upon the scale 43.

Releasing the coupling 21 from the pressure of the finger permits the valve stem to move away from the valve member 46 due to the action of the spring 27 against the head 25 of the plunger, whereupon the air valve 46 closes and the air within the pressure chamber 36 may leak from the bag 37 through the plunger. It is understood that when it is desired to pump the tires that the ordinary air pump hose is attached to the coupling 21 and the plunger depressed, whereupon the valve 46 is opened as heretofore described, the pressure of the air opening the valve 24 and permitting the air to pass freely into the tire, the pressure within the tire being indicated by the pointer 40 in the same manner as heretofore described.

From the above description and drawings, it will be readily understood that the air pressure within any tire equipped with our device may be readily ascertained without the removal of any cap or similar device from the valve stem.

What we claim is:—

1. A cap gauge for pneumatic tires comprising a cylindrical cap, a hollow stem on the lower end of the cap having an interiorly threaded portion arranged to engage the end of the valve stem of the tire, a hollow plunger extending through said cap arranged to engage the valve member in said valve stem, an elastic bag in said cap surrounding said hollow plunger in open communication with the interior of the hollow plunger, means for yieldingly holding said bag in collapsed position and an indicator operated by said bag.

2. A cap gauge for pneumatic tires comprising a cylindrical cap, a hollow stem on the lower end of the cap having an interiorly threaded portion arranged to engage the end of the valve stem of the tire, a hollow plunger extending through said cap arranged to engage the valve member in said valve stem, an elastic bag in said cap in open communication with the interior of the hollow plunger, means for yieldingly holding said bag in collapsed position and an indicator operated by said bag, said indicator comprising a piston freely movable on said plunger, a pointer on said plunger, and a window in said cap disclosing said pointer.

3. A cap gauge for pneumatic tires comprising a cylindrical cap, a hollow stem on the lower end of the cap having an interiorly threaded portion arranged to engage the end of the valve stem of the tire, a hollow plunger extending through said cap arranged to engage the valve member in said valve stem, an elastic bag in said cap in open communication with the interior of the hollow plunger, and an indicator operated by said bag, said indicator comprising a piston freely movable on said plunger, a pointer on said plunger, elastic means for yieldingly holding said piston against the top of said bag.

4. In combination with the valve stem of pneumatic tires, a hollow cap, a hollow stem secured to the lower end of the cap and threaded to receive the end of the valve stem, a hollow plunger in said cap, means on the lower end of the plunger arranged to engage the valve member in the valve stem, elastic means for holding said plunger in inoperative position, a piston slidably mounted on said plunger, pressure indicating means on said piston, and means for yieldingly holding said piston in zero indicating position, said plunger having openings therein under said piston whereby air under pressure is admitted from said plunger to the under side of the piston.

5. In combination with the valve stem of pneumatic tires, a hollow cap, a hollow stem secured to the lower end of the cap and threaded to receive the end of the valve stem, a hollow plunger in said cap, means on the lower end of the plunger arranged to engage the valve member in the valve stem, a head on the lower end of said plunger, a cushion on said head arranged to engage the end of the valve stem, elastic means for holding said plunger in inoperative position, and means operated by said plunger whereby the pressure in the tire is indicated.

6. In combination with the valve stem of pneumatic tires, a hollow cap, a hollow stem secured to the lower end of the cap and threaded to receive the end of the valve stem, a hollow plunger in said cap, means on the lower end of the plunger arranged to engage the valve member in the valve stem, elastic means for holding said plunger in inoperative position, a member slidably mounted on said plunger, an elastic bag under said slidable member in open communication with the interior of the plunger, and indicating means for showing the position of the slidable member in the cap.

7. In combination with the valve stem of a pneumatic tire, a cap mounted on the valve stem, a hollow plunger in said cap extending through the end of the cap, a piston in said cap, means for yieldingly holding said piston downwardly, and an elastic bag encircling said plunger under said piston arranged to receive air from the tire when the plunger is depressed.

In testimony whereof, we have hereunto set our hands at Los Angeles, California, this 17th day of September, 1919.

FREDERICK A. CONRAD.
JAMES L. CONRAD.